United States Patent [19]
Zhang

[11] Patent Number: 6,163,434
[45] Date of Patent: Dec. 19, 2000

[54] PIEZORESISTIVE POSITION SENSORS EMBEDDED IN DISC DRIVE MICROACTUATOR

[75] Inventor: Lei Zhang, San Jose, Calif.

[73] Assignee: Seagate Technology LLC, Scotts Valley, Calif.

[21] Appl. No.: 09/071,315

[22] Filed: May 1, 1998

Related U.S. Application Data

[60] Provisional application No. 60/063,225, Oct. 23, 1997.

[51] Int. Cl.$^7$ ....................................................... G11B 5/56
[52] U.S. Cl. ............................................. 360/106; 360/109
[58] Field of Search ..................................... 360/104, 106, 360/109

[56] References Cited

U.S. PATENT DOCUMENTS

| | | | |
|---|---|---|---|
| 4,605,977 | 8/1986 | Matthews | 360/103 |
| 4,620,251 | 10/1986 | Gitzendanner | 360/103 |
| 4,651,242 | 3/1987 | Hirano et al. | 360/103 |
| 4,853,810 | 8/1989 | Pohl et al. | 360/103 |
| 4,962,391 | 10/1990 | Kitahara et al. | 346/140 |
| 5,021,906 | 6/1991 | Chang et al. | 360/103 |
| 5,034,828 | 7/1991 | Ananth et al. | 360/75 |
| 5,065,268 | 11/1991 | Hagen | 360/104 |
| 5,072,240 | 12/1991 | Miyazawa et al. | 346/140 |
| 5,079,659 | 1/1992 | Hagen | 360/104 |
| 5,105,408 | 4/1992 | Lee et al. | 369/44.15 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,552,809 | 9/1996 | Hosono et al. | 347/10 |
| 5,657,188 | 8/1997 | Jurgenson et al. | 360/106 |
| 5,862,015 | 1/1999 | Evans | 360/104 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–½ Inch Inline HDD Using Multilayer Piezoelectric Load/Unload Mechanism" by Kajitani et al., *IEEE Transactions on Magnetics*, vol. 27, No. 6, Nov. 1991.

*Primary Examiner*—A. J. Heinz
*Attorney, Agent, or Firm*—Kinney & Lange, P.A.

[57] ABSTRACT

A disc drive has a recording disc rotatable about an axis, a slider supporting a transducing head for transducing data with the disc and a dual-stage actuation assembly supporting the slider and including an actuator, a suspension having a flexure and a microactuator to position the transducing head adjacent a selected radial track of the disc. The microactuator includes a stator attached to the flexure and a rotor operatively attached to the slider, the rotor being movable with respect to the stator. A microactuator suspension operatively attaches the rotor and the stator. At least one sensor in the microactuator suspension is cooperable with a detection circuit to determine a relative position of the transducing head.

12 Claims, 6 Drawing Sheets

PIEZORESISTIVE POSITION SENSORS EMBEDDED IN DISC DRIVE MICROACTUATOR

CROSS-REFERENCE TO RELATED APPLICATION(S)

This application claims priority from Provisional Application Serial No. 60/063,225 filed Oct. 23, 1997 for "Piezoresistive Position Sensors Embedded in Electromagnetic Micro Actuators" by L. Zhang.

Reference is hereby made to co-pending U.S. application Ser. No. 09/010,100, filed Jan. 21, 1998 for "Magnetic Microactuator and Inductive Sensor Having Shaped Pole Configuration" by L. Zhang, P. Ryan and P. Crane. Reference is also made to co-pending U.S. application Ser. No. 09-071,611, filed May 1, 1998 for "Electromagnetic Disc Drive Microactuator and Suspension" by L. Zhang, P. Crane and R. Resh.

BACKGROUND OF THE INVENTION

The present invention relates to a disc drive microactuator system, and more particularly to a sensor for detecting the relative position of a movable portion of a microactuator.

The density of concentric data tracks on magnetic discs continues to increase (that is, the radial spacing between data tracks is decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

Various microactuator locations and designs have been considered to achieve high resolution head positioning. One promising design involves inserting a silicon-based thin-film structure between the suspension and the slider in the disc drive assembly. One example of a high performance electromagnetic microactuator is disclosed in U.S. application Ser. No. 09/010,100 referenced above, which is hereby incorporated by reference.

It is often important when implementing a dual-stage servo control system for controlling the microactuator to know the relative position of the transducing head as positioned by the microactuator. The position of the microactuator is not necessarily linearly proportional to the signal input to the microactuator transducer, so it is necessary to provide a sensor for detecting the relative position of the microactuator. One example of a position sensor is to implement the microactuator as a dual port device, as shown in the aforementioned Zhang et al. application Ser. No. 09/010,100. The present invention is directed to a position sensing design that is independent of the design of the microactuator transducer.

BRIEF SUMMARY OF THE INVENTION

A disc drive has a recording disc rotatable about an axis, a slider supporting a transducing head for transducing data with the disc and a dual-stage actuation assembly supporting the slider and including an actuator, a suspension having a flexure and a microactuator to position the transducing head adjacent a selected radial track of the disc. The microactuator includes a stator attached to the flexure and a rotor operatively attached to the slider, the rotor being movable with respect to the stator to effect radial displacement of the transducing head. A microactuator suspension operatively attaches the rotor and the stator. At least one sensor in the microactuator suspension is cooperable with a detection circuit to determine the radial displacement of the transducing head effected by the microactuator. In one embodiment, the sensor is a piezoresistive strain gauge embedded in the microactuator suspension.

DETAILED DESCRIPTION OF THE PREFERRED EMBODIMENTS

Figure 1:
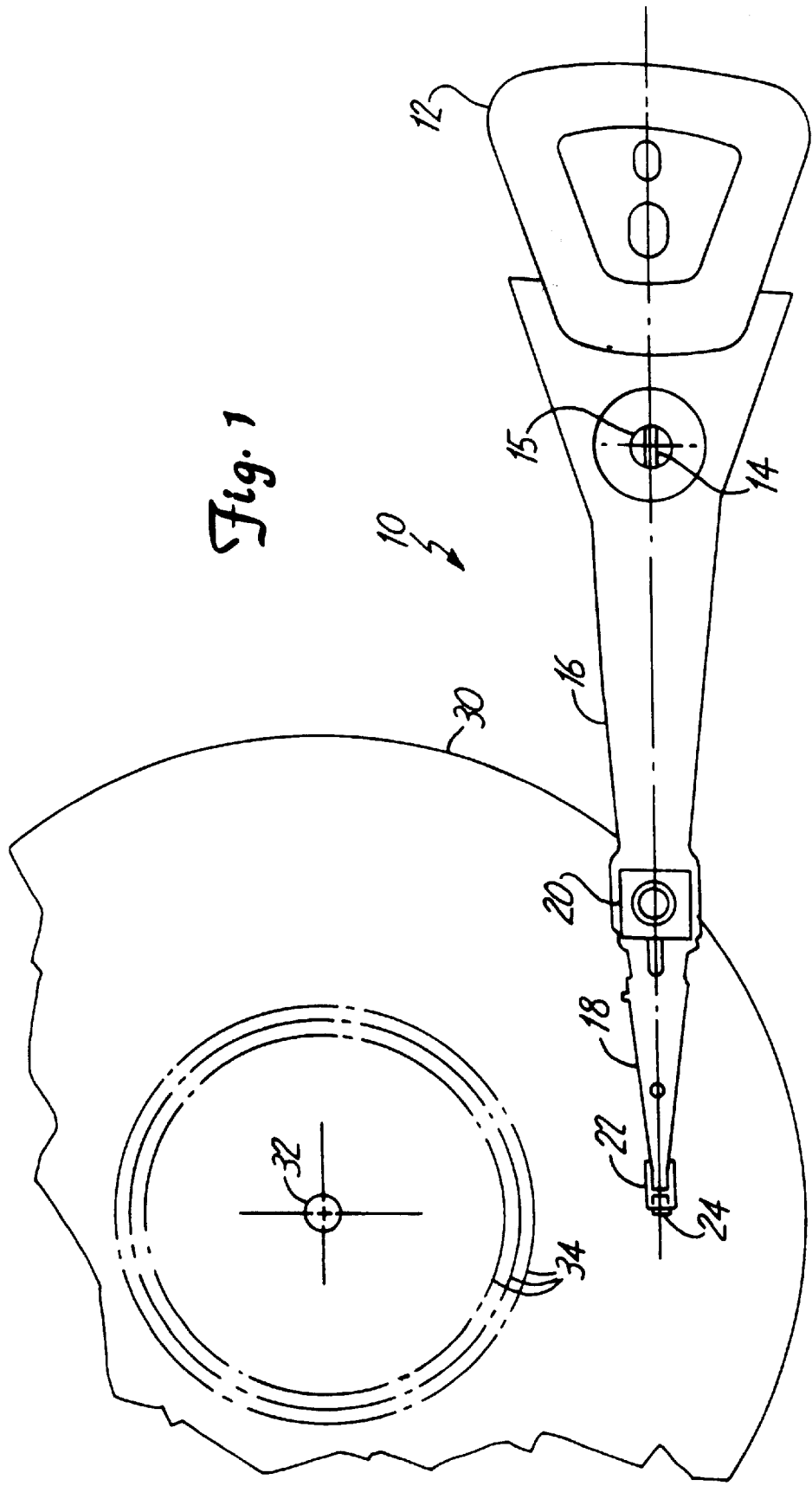
FIG. 1 is a plan view of a disc drive actuation system for positioning a slider over tracks of a disc.

FIG. 1 is a plan view of a disc drive actuation system 10 for positioning slider 24 over a selected track 34 of disc 30. Actuation system 10 includes voice coil motor (VCM) 12 arranged to rotate actuator arm 16 around axis 14 on spindle 15. Head suspension 18 is connected to actuator arm 16 at head mounting block 20. Flexure 22 is connected to head suspension 18, and carries slider 24. Slider 24 carries a transducing head (not shown in FIG. 1) for reading and/or writing data on concentric tracks 34 of disc 30. Disc 30 rotates around axis 32, so that windage is encountered by slider 34 to keep it aloft a small distance above the surface of the disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head on slider 24 precisely over a selected track 34 of disc 30. Therefor, a higher resolution actuation device is necessary.

Figure 2:
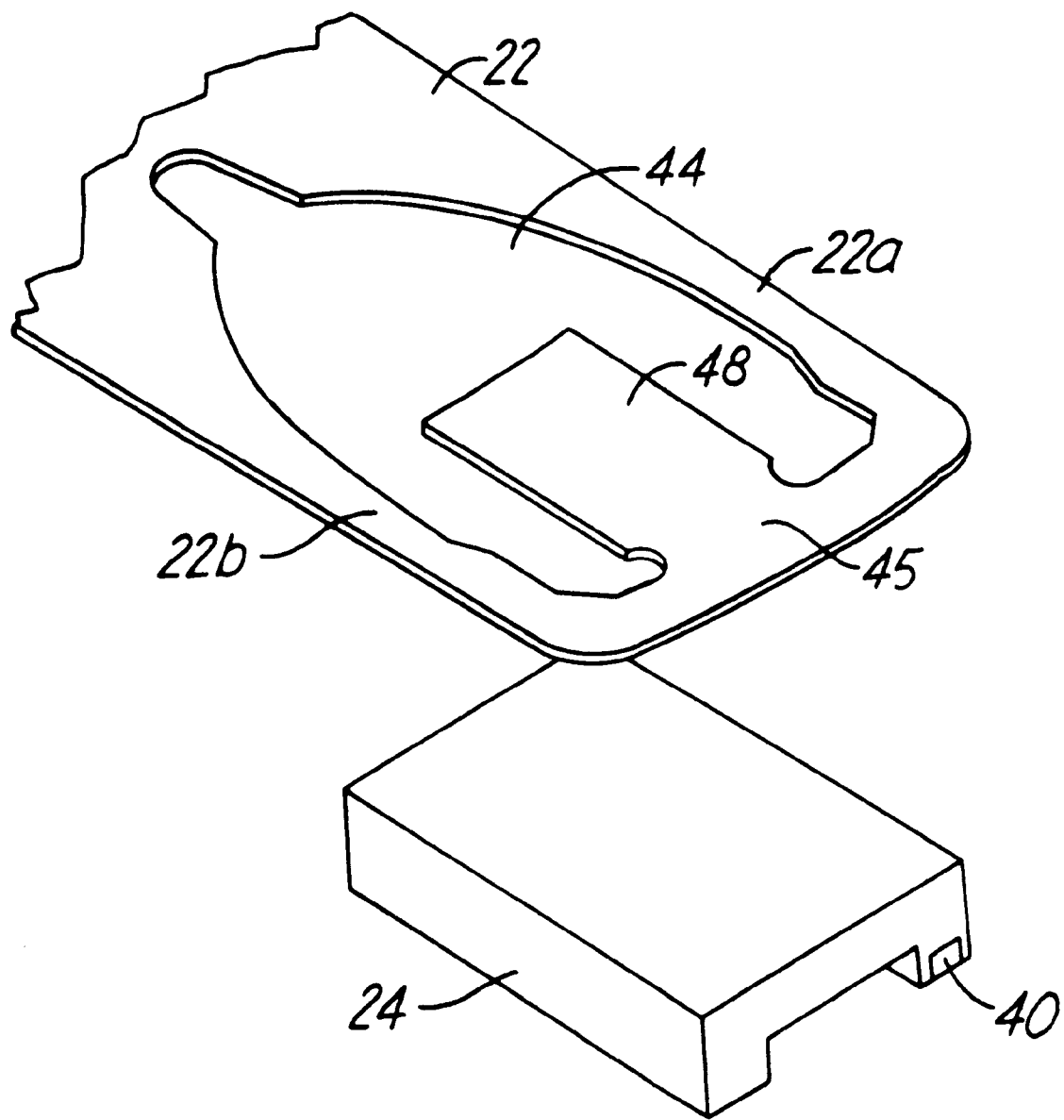
FIG. 2 is an exploded perspective view of a portion of the disc drive actuation system shown in FIG. 1, illustrating the relationship between the flexure and the slider.

FIG. 2 is an exploded perspective view of a portion of the disc drive actuation shown in FIG. 1, showing flexure 22 and slider 24 in more detail. Flexure 22 is mounted to the underside of a distal end of head suspension 18 (FIG. 1). Flexure 22 includes arms 22a and 22b forming aperture 44 therebetween to provide resilience and gimbaling spring to flexure 22. The distal end of arms 22a and 22b are connected by cross beam 45. Central tongue 48 extends from cross beam 45 into aperture 44 in a plane generally parallel to a plane defined by flexure arms 22a and 22b. The top surface of slider 24 is attached, such as by adhesive, to tongue spring 48. Transducing head 40 is carried at a trailing edge of slider 24.

Figure 3:
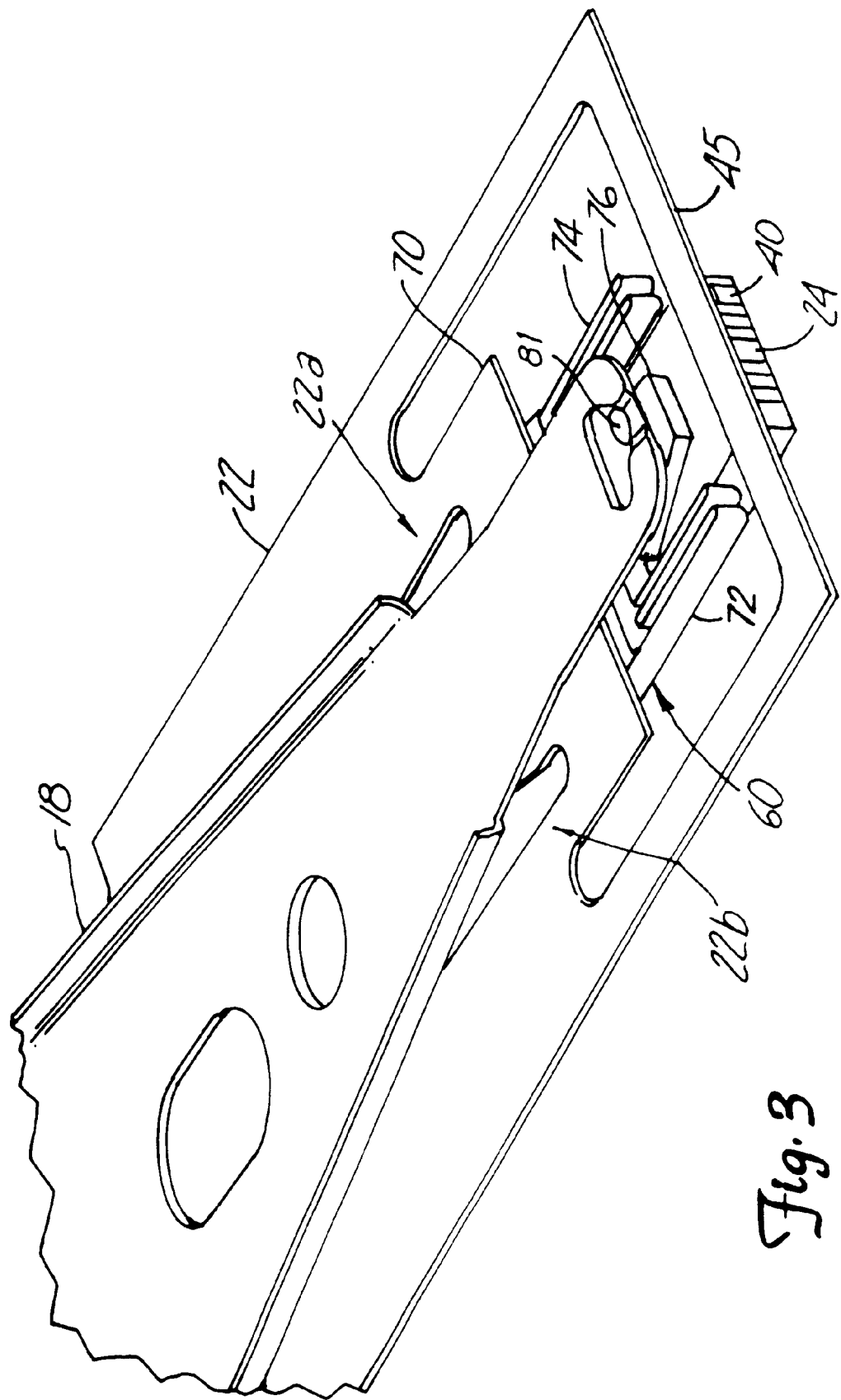
FIG. 3 is a top perspective view of a disc drive microactuation system for positioning a slider over tracks of a disc according to the present invention.
Figure 4:
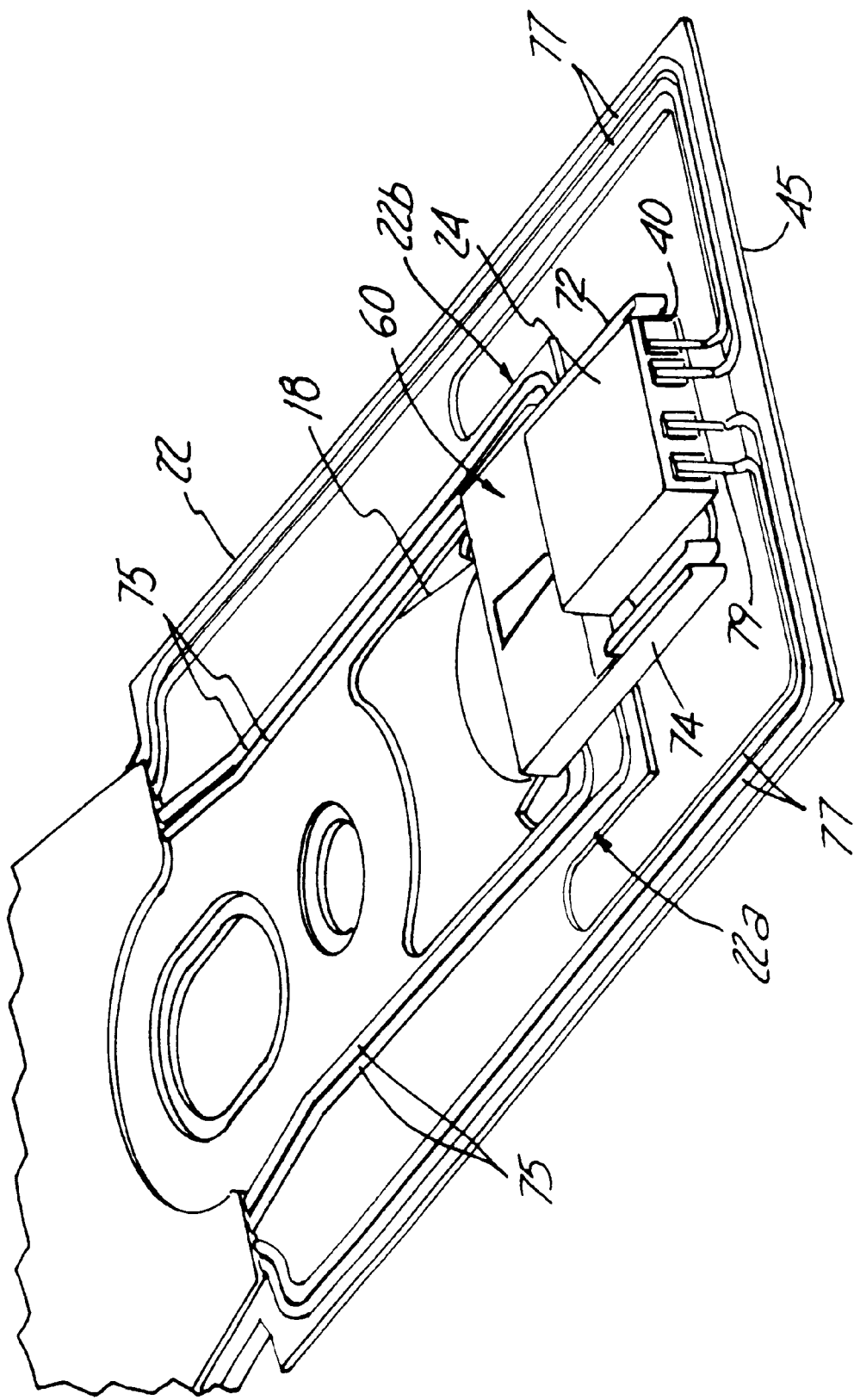
FIG. 4 is a bottom perspective view of the disc drive microactuation system shown in FIG. 3.
Figure 5:
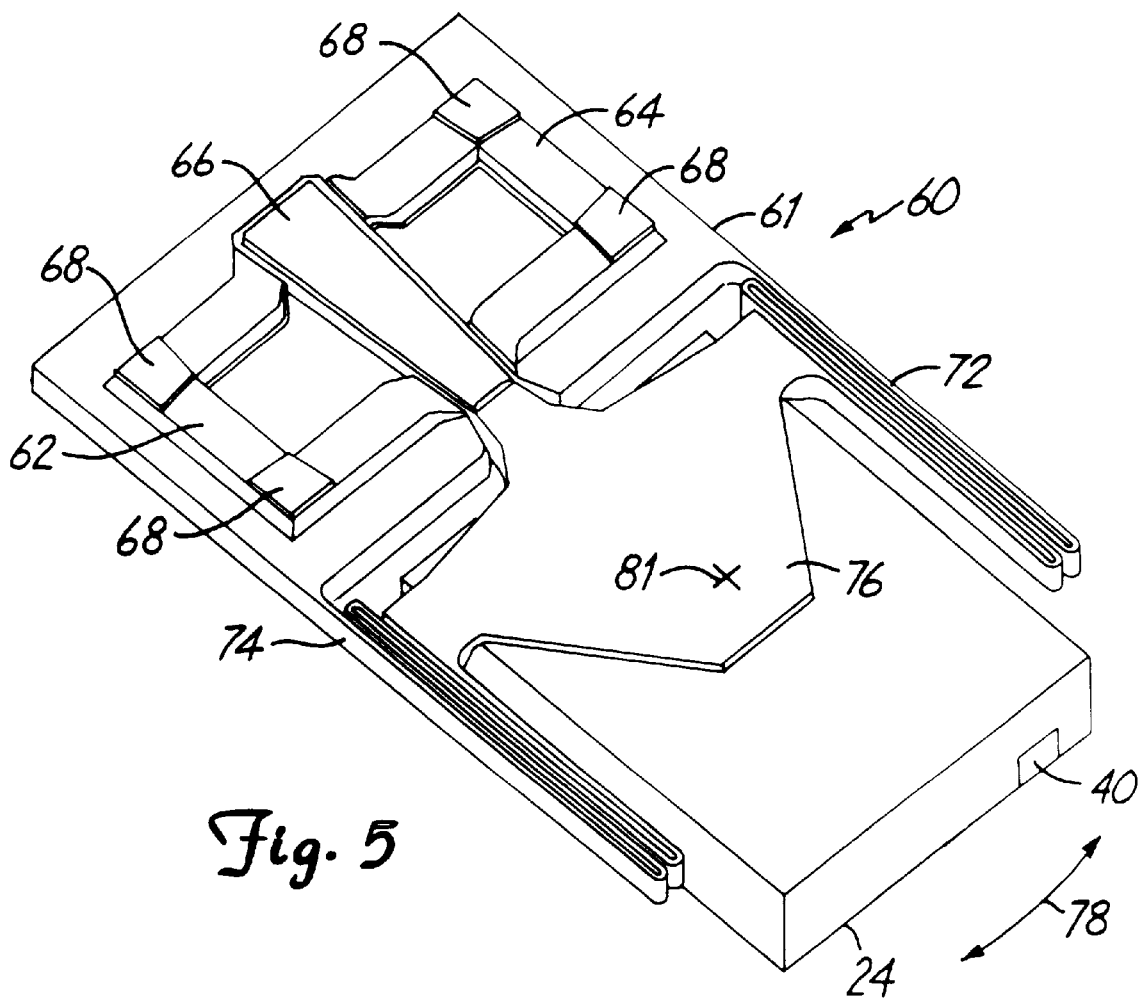
FIG. 5 is a perspective view of a microactuator configured between the flexure and the slider of a disc drive microactuation system.

FIG. 3 is a top perspective view, and FIG. 4 is a bottom perspective view of a disc drive microactuation system for positioning slider 24 over tracks of a disc according to the present invention. FIG. 5 is a perspective view of microactuator 60 configured between flexure 22 and slider 24 in the disc drive microactuation system. Flexure 22 is mounted to the underside of a distal end of head suspension 18 in a conventional manner. Flexure 22 includes arms 22a and 22b forming an aperture therebetween to provide resilience and gimbaling spring to flexure 22. Flexure 22 further includes tongue portion 70 in substantially the same plane as flexure arms 22a and 22b. The distal end of arms 22a and 22b are connected via tongue portion 70.

Microactuator 60 includes first stator 62 and second stator 64, with bond pads 68 providing access to contact first and second stators 62 and 64. Rotor 66 is formed between first and second stators 62 and 64, and is movable with respect to the stators. A "silicon suspension" is provided, including flexible arms 72 and 74 extending from the body of the stator portion of microactuator 60 and connecting on opposite sides to central tongue 76, which is a slider bond pad attached to a distal end of rotor 66 and attached to slider 24 by an adhesive, for example. Pre-load force is applied through central tongue 76 to slider 24 at pre-load point 81. Therefore, operation of microactuator 60 translationally moves rotor 66 with respect to first and second stators 62 and 64, which in turn forces bending of arms 72 and 74 and alters the position of central tongue 76, moving transducing head with respect to flexure 22 in the direction of arrows 78, to radially position head 40 over a radial data track of a rotating disc below slider 24. A more detailed discussion of the structure and operation of microactuator 60 may be found in U.S. application Ser. No. 09/010,100, and a more detailed discussion of the microactuator suspension may be found in U.S. application Ser. No. 09/071,611 which is hereby incorporated by reference.

Figure 6:
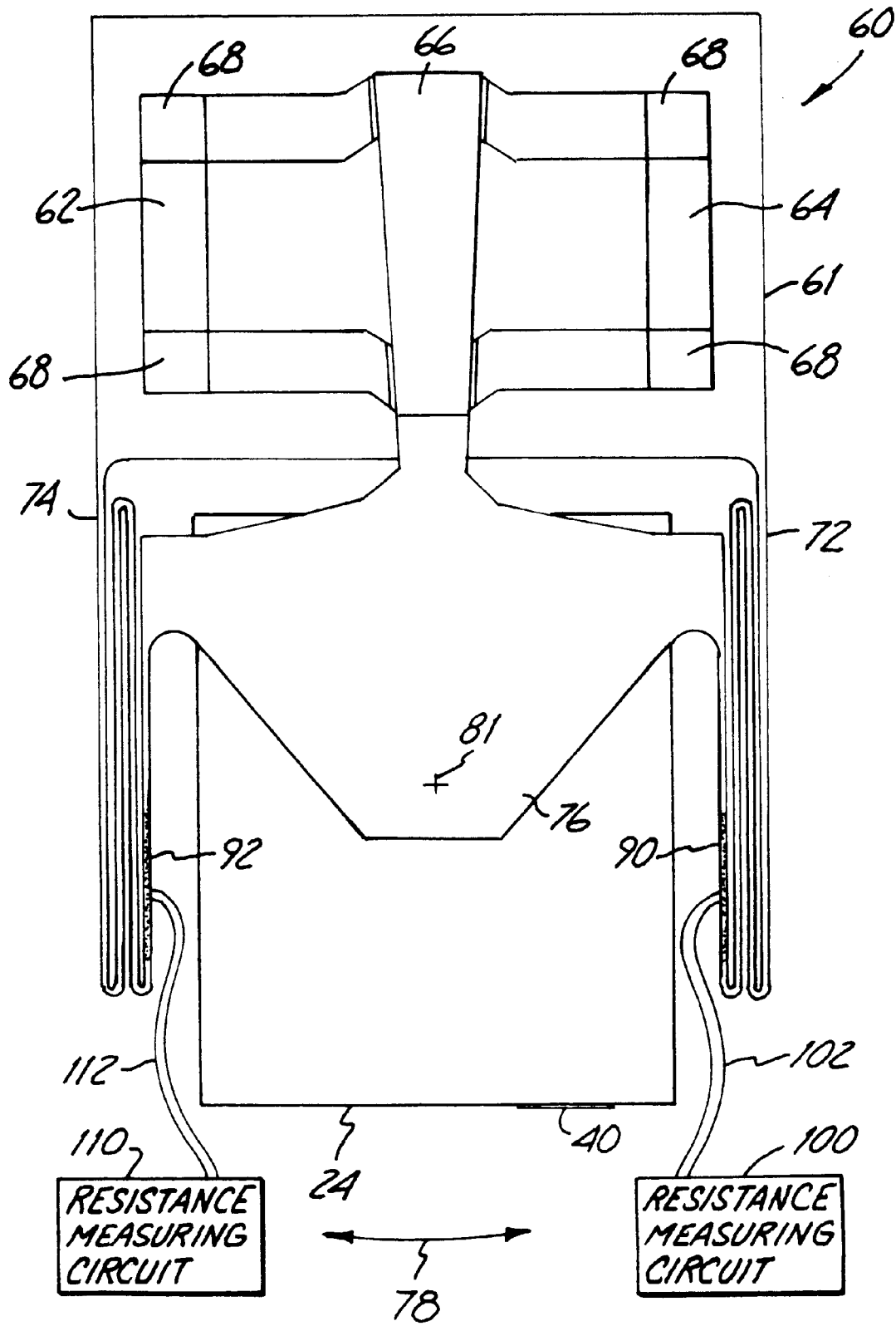
FIG. 6 is a top view of a microactuator including piezoresistive strain gauges according to the present invention.

FIG. 6 is a top view of microactuator 60 including piezoresistive strain gauges 90 and 92 embedded in microactuator suspension arms 72 and 74, respectively. Strain gauges 90 and 92 operate according to the piezoresistive effect, in which a change of mechanical strain acting on elements 90 and 92 results in a change in the resistance of those elements. Strain gauges 90 and 92 are accordingly composed of a material exhibiting the piezoresistive effect. Piezoresistive elements have characteristic longitudinal and transverse gauge factors associated with them, such that the relationship between the resistance change and the mechanical strain of the element is defined by:

$$\frac{\Delta R}{R} = G_l \varepsilon_l + G_t \varepsilon_t$$

where $\Delta R$ is the resistance change of the element, R is the total resistance of the element, $G_l$ and $G_t$ are the longitudinal and transverse gauge factors, respectively, and $\varepsilon_l$ and $\varepsilon_t$ are the longitudinal and transverse strain forces, respectively. A preferred piezoresistive material is doped polysilicon, because of its high characteristic gauge factors. It will be understood by one skilled in the art that a number of piezoresistive materials may alternatively be used to realize strain gauges 90 and 92.

In operation, strain gauges 90 and 92 are utilized to determine the relative displacement between stators 62 and 64 and rotor 66. Strain gauge 90 is connected to resistance measuring circuit 100 by wire 102, and strain gauge 92 is connected to resistance measuring circuit 110 by wire 112. Wires 102 and 112 shown in FIG. 6 are intended to illustrate connection to resistance measuring circuits 100 and 110 schematically, and it will be understood by one skilled in the art that a number of physical connection mechanisms are possible. In one embodiment, resistance measuring circuits 100 and 110 are Wheatstone bridges, which are circuits having resistor configurations that are well known in the art to determine an unknown resistance value. A variety of other circuits may alternatively be used to implement resistance measuring circuits 100 and 110, with the output of resistance measuring circuits 100 and 110 representing the relative resistance change of strain gauges 90 and 92 in response to physical strain on arms 72 and 74 due to deflection of rotor 66.

Strain gauges 90 and 92 are realized within silicon arm beams 72 and 74 by a simple procedure performed during the process of fabricating arm beams 72 and 74. Prior to forming the final overcoat layer of arm beams 72 and 74, a layer of silicon nitride is deposited on the silicon beam substrate. The layer of silicon nitride is preferably formed by Low Pressure Chemical Vapor Deposition (LPCVD) or another appropriate micro-machining technique known to those skilled in the art. A doped polysilicon layer is deposited on the silicon nitride layer as the piezoresistive material of the strain gauge, and another silicon nitride layer is formed over the doped polysilicon layer. The top silicon nitride layer is lithographically patterned and etched according to techniques known in the art, and the remaining silicon nitride acts as a mask to define the strain gauge in the polysilicon layer. Electrical connections to the piezoresistive strain gauges are preferably realized in a manner known in the art by e-beam evaporation of aluminum, for example, and electrical connections to the circuit board containing resistance measuring circuits 110 and 112 may be realized using a wiring technique known in the art such as ultrasonic wire bonding. Therefore, piezoresistive strain gauges 90 and 92 may be realized in arm beams 72 and 74 of microactuator 60 with relatively simple fabrication techniques, such that minimal additional process steps are required to provide the position sensing function achieved by the present invention.

The present invention is operable to detect the relative position of a transducing head as positioned by a microactuator in a disc drive system. One or more piezoresistive strain gauges are provided in the microactuator suspension, with the resistance of the strain gauges being related to strain on the microactuator suspension and therefore the relative position of the transducing head. Resistance measuring circuits are connected to the strain gauges to determine the position of the transducing head. The position sensing system of the present invention therefore does not affect the electromagnetic field generated by the microactuator itself, ensuring the accuracy of the sensor and the microactuator.

Although the present invention has been described with reference to preferred embodiments, workers skilled in the art will recognize that changes may be made in form and detail without departing from the spirit and scope of the invention.

What is claimed is:

1. A magnetic disc drive comprising:
   a microactuator on an actuator assembly for radially displacing a transducing head carried by a slider with respect to a rotatable disc, the microactuator including a stator attached to the actuator assembly, a rotor operatively attached to the slider, and a plurality of beams connecting the stator and the rotor; and
   means for sensing a strain force in the plurality of beams to indicate a radial displacement of the transducing head effected by the microactuator.

2. A disc drive having a recording disc rotatable about an axis, a slider supporting a transducing head for transducing data with the disc and a dual-stage actuation assembly supporting the slider and including an actuator assembly, a suspension having a flexure and a microactuator to position the transducing head adjacent a selected radial track of the disc, the microactuator comprising:

a stator attached to the flexure;

a rotor operatively attached to the slider, the rotor being movable with respect to the stator;

a microactuator suspension operatively attaching the rotor and the stator, the microactuator suspension including a plurality of beams; and at least one sensor embedded in the plurality of beams of the microactuator suspension cooperable with a detection circuit to sense a strain force in the plurality of beams to determine a relative position of the transducing head.

3. The disc drive of claim 2, wherein the at least one sensor comprises a piezoresistive strain gauge embedded in the beams of the microactuator suspension.

4. The disc drive of claim 3, wherein the detection circuit comprises a Wheatstone bridge.

5. The disc drive of claim 3, wherein the piezoresistive strain gauge is at least partially composed of doped polysilicon.

6. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:

a movable actuator arm;

a suspension assembly supported by the actuator arm, the suspension assembly including a flexure;

a slider bond pad supporting the slider; and a microactuator comprising:

a rotor attached to the slider bond pad;

a stator attached to the flexure and operatively connected to the rotor to radially move the rotor with respect to the stator;

at least one beam attached between the slider bond pad and the stator; and at least one sensor embedded in the beam for sensing a strain force in the beam and thereby determining a relative position of the transducing head.

7. The disc drive of claim 6, wherein the at least one beam has a length greater than a length of the slider and is folded so that the beam extends along only a portion of the length of the slider.

8. The disc drive of claim 6, wherein the at least one beam is composed of silicon.

9. The disc drive of claim 6, wherein the at least one sensor comprises a piezoresistive strain gauge embedded in the beam.

10. The disc drive of claim 9, further comprising resistance measuring circuitry operatively connected to the piezoresistive strain gauge.

11. The disc drive of claim 10, wherein the resistance measuring circuitry comprises a Wheatstone bridge.

12. The disc drive of claim 9, wherein the piezoresistive strain gauge is at least partially composed of doped polysilicon.

\* \* \* \* \*